(12) United States Patent
Ledig et al.

(10) Patent No.: US 12,152,675 B2
(45) Date of Patent: Nov. 26, 2024

(54) MECHANICAL SEAL ARRANGEMENT WITH IMPROVED COOLING CHARACTERISTICS

(71) Applicant: EagleBurgmann Germany Gmbh & Co. KG, Wolfratshausen (DE)

(72) Inventors: Stefan Ledig, Pöcking (DE); Martin Kuntz, Unterhaching (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 89 days.

(21) Appl. No.: 18/031,265

(22) PCT Filed: Nov. 2, 2021

(86) PCT No.: PCT/EP2021/080329
§ 371 (c)(1),
(2) Date: Apr. 12, 2023

(87) PCT Pub. No.: WO2022/096430
PCT Pub. Date: May 12, 2022

(65) Prior Publication Data
US 2023/0375089 A1 Nov. 23, 2023

(30) Foreign Application Priority Data
Nov. 5, 2020 (DE) ............ 10 2020 129 125.6

(51) Int. Cl.
*F16J 15/34* (2006.01)
(52) U.S. Cl.
CPC ....... *F16J 15/3404* (2013.01); *F16J 15/3484* (2013.01)
(58) Field of Classification Search
CPC ...... F16J 15/34; F16J 15/3404; F16J 15/3412; F16J 15/3484
See application file for complete search history.

(56) References Cited

U.S. PATENT DOCUMENTS

| 5,217,234 A * | 6/1993 | Hornsby | F16J 15/3404 |
| | | | 277/408 |
| 5,909,878 A * | 6/1999 | Schrufer | F16J 15/3404 |
| | | | 277/398 |

(Continued)

FOREIGN PATENT DOCUMENTS

| DE | 102013223226 A1 | 6/2015 |
| EP | 0790446 A1 | 8/1997 |
| GB | 2286020 A | 8/1995 |

OTHER PUBLICATIONS

International Search Report issued in PCT/EP2021/080329, dated Feb. 7, 2022.

*Primary Examiner* — Eugene G Byrd
*Assistant Examiner* — L. Susmitha Koneru
(74) *Attorney, Agent, or Firm* — Locke Lord LLP; Scott D. Wofsy (57) ABSTRACT

The invention relates to a mechanical seal arrangement comprising a first mechanical seal (2) having a first rotating sliding ring (22) and a first stationary sliding ring (21) defining a first sealing gap (20) therebetween, a second mechanical seal (3) having a second rotating sliding ring (22) and a second stationary sliding ring (32) defining a second sealing gap (30) therebetween, a housing (4) having an inlet (40) and an outlet (41) for a cooling liquid, a rotating conveying sleeve (5) joined to the first rotating sliding ring (22) and the second rotating sliding ring (32), the conveying sleeve (5) having a plurality of conveying grooves (50) on its outer circumference wherein the first stationary sliding ring (21) is arranged radially outside the conveying sleeve (5) and has an inner circumference (21*a*) which is arranged eccentrically with respect to an outer circumference (50*a*) of the conveying sleeve (5) so that a circumferential eccentric gap (6) is formed between the outer circumference (50*a*) of the conveying sleeve (5) and the inner circumference (21*a*)

(Continued)

of the first stationary sliding ring (21) and wherein the first stationary sliding ring (21), on a rear side (21*b*) facing away from the first sealing gap (20), has a first slot (9) directed towards the outlet (41) and a first widening recess (11) on the inner circumference (21*a*), which recess opens into the first slot (9).

15 Claims, 5 Drawing Sheets

(56) References Cited

U.S. PATENT DOCUMENTS

| | | | |
|---|---|---|---|
| 10,337,616 B2 * | 7/2019 | Parkin | F16J 15/3484 |
| 2016/0341317 A1 * | 11/2016 | Fichtner | F16J 15/3404 |
| 2022/0221060 A1 * | 7/2022 | Obertanner | F04D 29/128 |

* cited by examiner

MECHANICAL SEAL ARRANGEMENT WITH IMPROVED COOLING CHARACTERISTICS

CROSS-REFERENCE TO RELATED APPLICATIONS

This application is a U.S. National Phase Application filed under 35 U.S.C. § 371, based on International Patent Application No. PCT/EP2021/080329, filed Nov. 2, 2021, which claims priority to German Patent Application No. 10 2020 129 125.6, filed on Nov. 5, 2020, which are incorporated herein by reference.

The present invention relates to a mechanical seal arrangement with improved cooling characteristics and, in particular, a stationary sliding ring which—at least partially—is washed around at an inner circumference and at an outer circumference.

Mechanical seal arrangements are known from prior art to have various configurations. In operation, so-called barrier fluid systems are frequently used in mechanical seal arrangements which barrier fluid systems, in addition to lubrication, are also employed especially for heat dissipation at the mechanical seals. Cooling the mechanical seal is in particular used to prevent overheating during operation entailing possible consequential damage to the mechanical seal arrangement. However, for cooling sufficiently, a specific flow rate is to be enabled in the area of the mechanical seal. The sealing or cooling fluid is usually fed into the area of the mechanical seal through an inlet and discharged through an outlet. It is known, for example, to use so-called conveying sleeves which support a movement of the cooling fluid from the inlet to the outlet by their rotation. Basically, however, there is a need to continuously improve cooling performance so as to further improve service life and performance of a mechanical seal arrangement.

Therefore, it is the object of the present invention to provide a mechanical seal arrangement that enables improved cooling performance and having simple structure and simple, low-cost manufacturability.

This object will be achieved by a mechanical seal arrangement having the features of claim 1. Preferred further embodiments of the invention will be shown in the subclaims.

In contrast, the mechanical seal arrangement according to the invention having the features of claim 1 has the advantage that improved cooling effect will be effected. As a result, service life and in particular also wear performance of the mechanical seal arrangement can be improved. Specifically, significant improved conveying performance and thus improved cooling can be achieved by combining several modifications. According to the invention, this will be achieved by the mechanical seal arrangement with a first and a second mechanical seal. Each of the mechanical seals has a rotating sliding ring and a stationary sliding ring, which define a sealing gap therebetween. Furthermore, a housing having an inlet and an outlet for a cooling fluid is provided. Furthermore, the mechanical seal arrangement comprises a rotating conveying sleeve which is joined to the first rotating sealing surface of the first mechanical seal and the second rotating sealing surface of the second mechanical seal. The conveying sleeve has a plurality of conveying grooves on the outer circumference so that cooling fluid is moved when rotating the conveying sleeve. The first stationary mechanical seal is arranged radially outside the conveying sleeve. In this case, an inner circumference of the first stationary sliding ring of the first mechanical seal is arranged eccentrically to an outer circumference of the conveying sleeve. This results in a circumferential eccentric gap between the outer circumference of the conveying sleeve and the inner circumference of the first stationary sliding ring, through which the cooling liquid is conveyed. This will significantly increase a conveying speed of the conveyed fluid. Furthermore, the first stationary sliding ring has a slot on a rear side facing away from the first sealing gap and a widening recess on the inner circumference. The recess opens into the slot. By means of this measure, significantly improved outflow of the conveyed fluid into the outlet is achieved, so that efficiency of the conveying sleeve is significantly improved.

Further preferably, an annular gap is formed adjacent to the rear side of the first stationary sliding ring between a stationary component, for example a housing, and the outer circumference of the stationary sliding ring. As a result, on the side of the first sliding ring facing away from the first sealing gap, conveying will be enabled both on the inner circumference of the stationary sliding ring and on the outer circumference of the stationary sliding ring. This enables cooling of the stationary sliding ring from two circumferential sides, i.e. inside and outside, in the region of the free end of the stationary sliding ring located at the rear side.

Further preferably, a second widening recess is formed on the housing adjacent to the rear side of the first stationary sliding ring, which opens into the outlet. Thus, the annular gap also opens to the outlet, so that an improved outflow of the fluid from the annular gap into the outlet is allowed. As a result, cooling fluid conveying efficiency may further be improved.

According to another preferred embodiment of the invention, the rotating conveying sleeve is configured such that the conveying sleeve comprises a receiving region for fixing the first rotating sliding ring of the first mechanical seal. Consequently, the receiving region is designed such that the first rotating sliding ring is at least partially embraced. This enables simple and secure fixing of the first rotating sliding ring to the conveying sleeve.

Especially preferably, a number of n conveying grooves in the conveying sleeve is $12 \leq n$, and in particular is in a range between $18 \leq n \leq 24$. This makes the conveying grooves to preferably run parallel to a center axis of the mechanical seal arrangement, resulting in production of the conveying grooves to be particularly easy.

Preferably, the rear side of the first stationary sliding ring of the first mechanical seal is located radially inside the outlet. Thus, the rear side of the first stationary sliding ring is arranged below the outlet, so that cooling liquid continuously flows around the rear side of the first stationary sliding ring.

Further preferably, a centerline of the outlet and the backside of the first stationary sliding ring are located in a common plane perpendicular to the axial direction X-X. Thus, a shadow projection of the outlet onto the first stationary sliding ring is such that the shadow is partially located on the first stationary sliding ring. Especially preferably, the rear side of the first stationary sliding ring is also located in the center of the inlet.

According to another preferred embodiment of the invention, the inlet and the outlet are arranged in the housing in the axial direction of the mechanical seal arrangement between the first and second mechanical seals. Especially preferably, the inlet and the outlet are thereby located 180° opposite to each other along the circumference of the mechanical seal arrangement. Furthermore, it is preferred that a diameter of the inlet is equal to a diameter of the outlet.

An arrangement which is particularly flow-effective will be achieved if the inlet, the outlet and the first and second slots are preferably arranged coaxially with respect to each other. Further preferably, the diameters of the inlet, outlet and a width of the first and second slot are the same.

To achieve a particularly good cooling effect on the mechanical seals a volume of the second recess in the housing is preferably larger than a volume of the first recess of the first stationary mechanical seal.

Further preferably, the annular gap at the outer circumference of the first stationary sliding ring has a constant gap width over the circumference.

Preferably, the eccentricity between the conveying sleeve and the first stationary sliding ring is located on a horizontal line of the mechanical seal arrangement. Alternatively, the eccentricity is located on a straight line which is located at an angle of 45° to the horizontal line and a vertical line.

In order to further improve a cooling effect and further increase an efficiency of the conveying sleeve, a second slot is preferably provided on the first stationary sliding ring on the rear side facing away from the sealing gap and a third tapered recess is provided on the inner circumference of the first stationary sliding ring. The third tapered recess tapers, starting from the second slot, towards the eccentric gap. This results in better inflow of fluid into the eccentric gap, which allows a conveying capacity and thus a cooling effect to be further improved.

Further preferably, a fourth tapered recess is formed on the housing, which tapers starting from the inlet towards the annular gap between the housing and the outer circumference of the first stationary sliding ring. This can also improve a conveying performance and thus a cooling performance of the arrangement.

If the third and fourth recesses are provided at the second slot, the mechanical seal arrangement may also be operated independently of the rotational direction.

Especially preferably, the mechanical seal arrangement is a preassembled arrangement, such that the mechanical seal arrangement can be mounted on the shaft to be sealed as a cartridge. In this way, in particular errors can be avoided during on-site assembly.

In the following, a preferred example embodiment of the invention is described in detail while reference will be made to the accompanying drawings, wherein.

In the following, a mechanical seal arrangement 1 according to a first preferred example embodiment of the invention is described in detail while making reference to FIGS. 1 to 5, As may be seen from FIG. 1, the mechanical seal arrangement 1 comprises a first mechanical seal 2 and a second mechanical seal 3. The two mechanical seals 2, 3 are arranged in series in the axial direction X-X of the mechanical seal arrangement.

The mechanical seal arrangement 1 thus seals against a shaft 10.

The first mechanical seal 2 comprises a first stationary sliding ring 21, a first rotating sliding ring 22 and a sealing gap 20, which is arranged between the first stationary sliding ring 21 and the first rotating sliding ring 22. The second mechanical seal assembly 3 comprises a second stationary sliding ring 31, a second rotating sliding ring 32, and a seal gap 30 disposed between the second stationary sliding ring 31 and the second rotating sliding ring 32.

Furthermore, the mechanical seal arrangement 1 comprises a housing 4 on which the stationary sliding rings 21, 31 are arranged. As may be further seen from FIG. 1, an inlet 40 and an outlet 41 for a cooling fluid are provided in the housing 4. In this example embodiment, the inlet and the outlet are arranged cylindrically and 180° opposite to each other on the mechanical seal arrangement 1. As a result, the center lines 60 of the inlet 40 and outlet 41 are located on a common straight line.

Furthermore, the mechanical seal arrangement 1 comprises a rotating conveying sleeve 5. The conveying sleeve 5 is joined to the first rotating sliding ring 22 and the second rotating sliding ring 32. Herein, the first rotating mechanical sliding ring 22 is partially surrounded by the conveying sleeve 5 at a receiving region 51 of the conveying sleeve 5. The second rotating sliding ring 32 is fixed to the conveying sleeve 5 using a sliding ring support 33.

Figure 5:
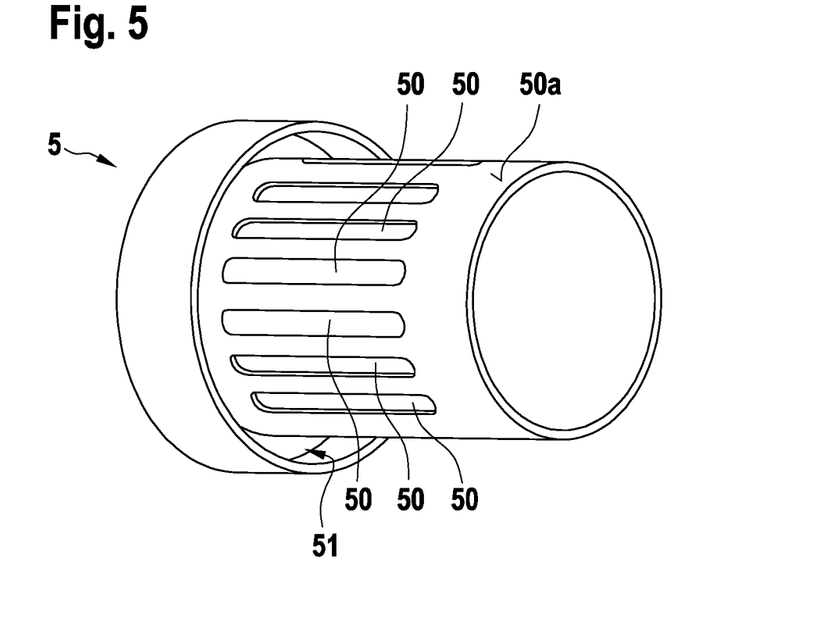
FIG. 5 is a schematic, perspective view of a conveying sleeve of the mechanical seal arrangement of FIG. 1.

The conveying sleeve 5 may be seen in detail in FIG. 5. As shown in FIG. 5, the conveying sleeve 5 has a plurality of conveying grooves 50 which are arranged on an outer circumference 50a of the conveying sleeve 5. The conveying grooves 5 are formed parallel to the axial direction X-X. Preferably, a number of n conveying grooves 50 is greater than or equal to 12 and in particular is between 18 and 24 conveying grooves. Again, FIG. 5 also shows in detail the receiving region 51 of the conveying sleeve 5 to which the first rotating sliding ring 21 is fixed.

Figure 2:
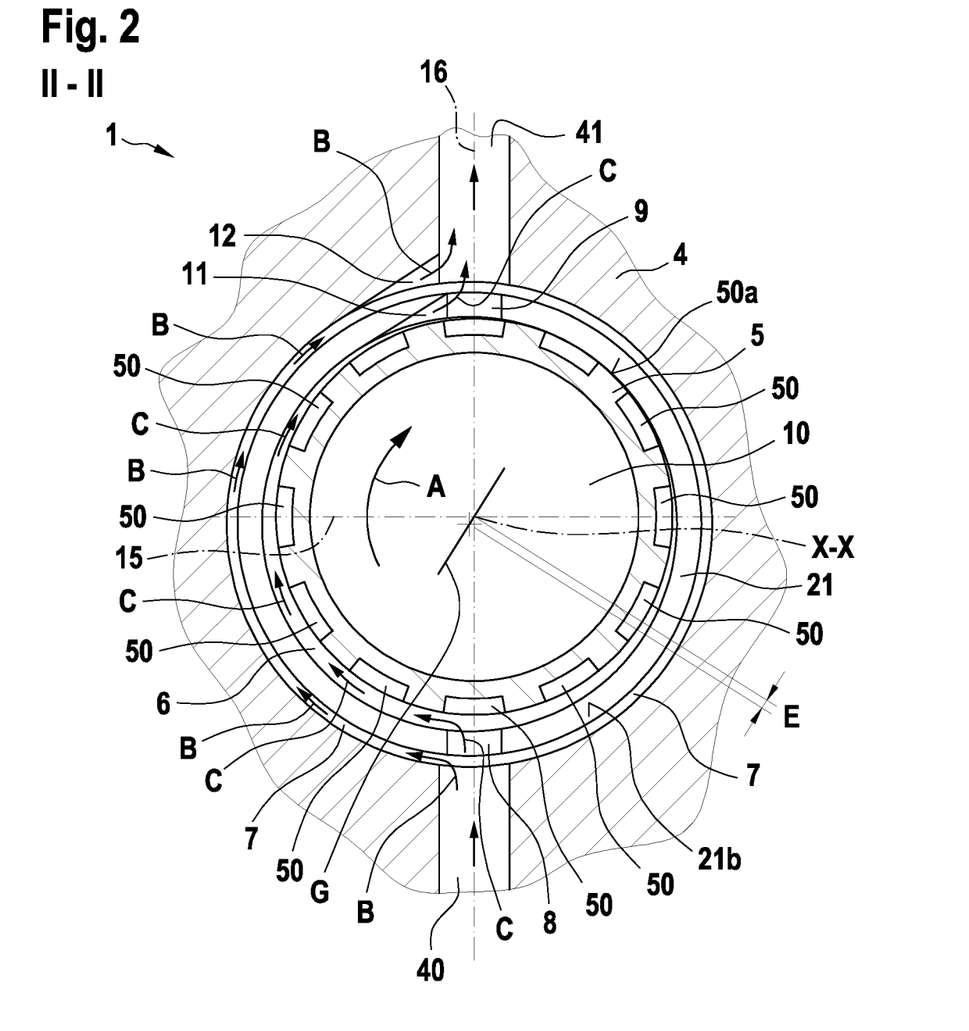
FIG. 2 is a schematic cross-sectional view along line II-II of FIG. 1.

As may in particular be seen from FIG. 2, the first stationary sliding ring 21 has an inner circumference 21a, which is arranged eccentrically to an outer circumference 50a of the conveying sleeve 5. This results in a circumferential eccentric gap 6, which is formed between the conveying sleeve 5 and the first stationary sliding ring 21 on its rear side 21b facing away from the sealing gap 20 (cf. FIG. 3).

As may further be seen in particular from FIG. 2, the annular eccentric gap 6 tapers starting from the inlet 40 towards the outlet 41. In contrast, an annular gap 7 between the first stationary sliding ring 21 and the housing 4 remains constant (cf. FIG. 2). An eccentricity E between the conveying sleeve 5 and the first stationary sliding ring is located on a straight line G, which is at an angle of 45° to a horizontal line 15 and to a vertical line 16 of the mechanical seal arrangement 1.

Figure 3:
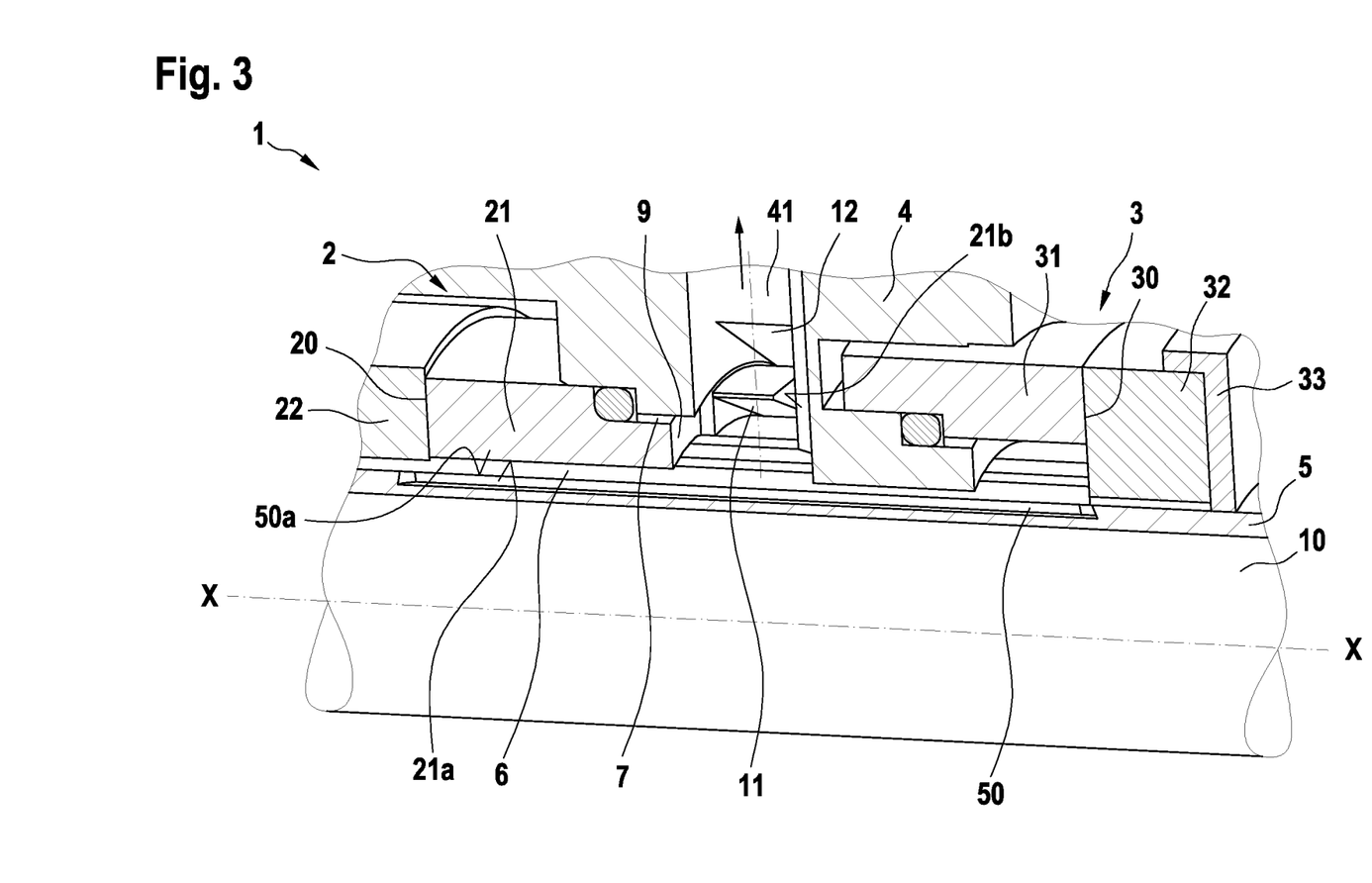
FIG. 3 is a schematic, perspective, enlarged sectional view of the mechanical seal of FIG. 1.

As may further be seen from FIGS. 2 and 3, a first slot 9 and a second slot 8 are formed on the rear side 21b of the first stationary sliding ring 21. The first slot 9 is arranged coaxially with the outlet 41 and the second slot 8 is arranged coaxially with the inlet 40 (cf. FIG. 2).

These slots 8, 9 are only relatively small in depth T in the axial direction X-X (cf. FIG. 1), so that the first stationary sliding ring 21 maintains its basic stability.

Figure 1:
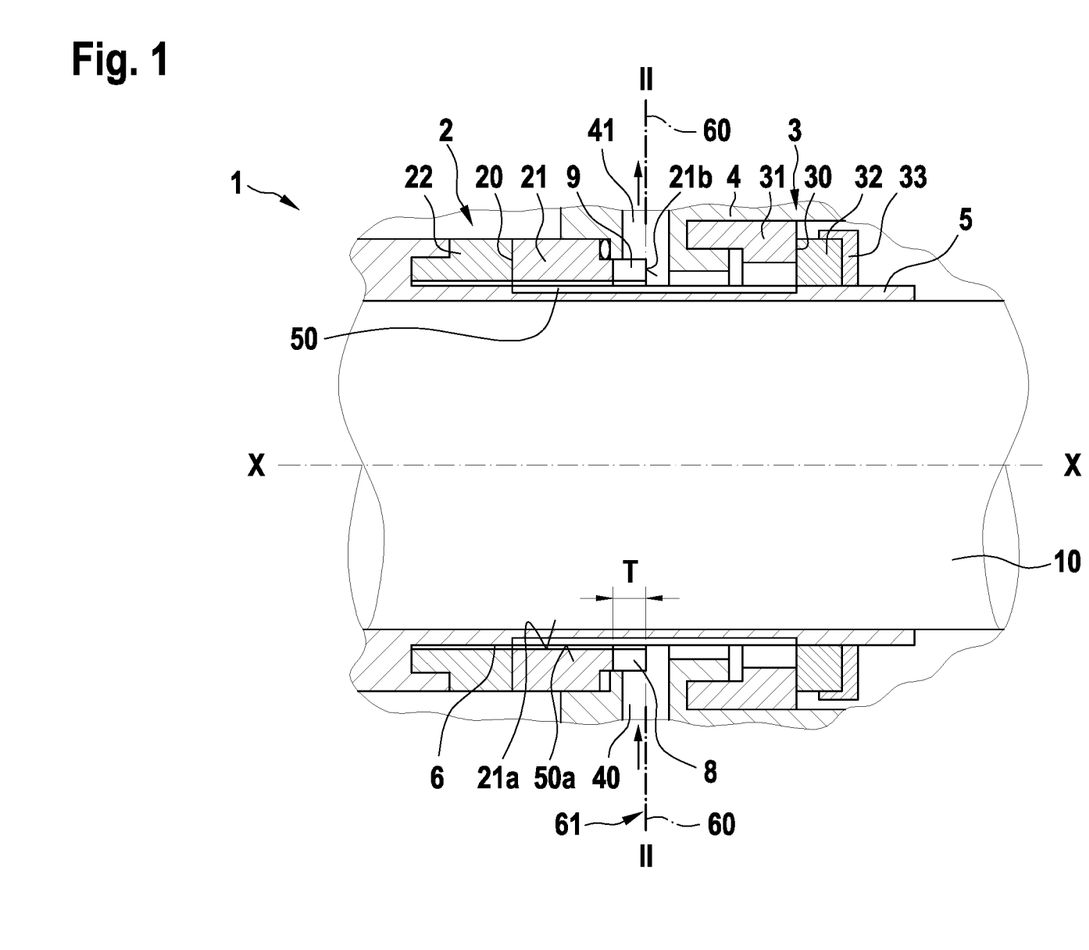
FIG. 1 is a schematic cross-sectional view of a mechanical seal arrangement according to a first preferred example embodiment of the invention.

The center lines 60 of the inlet 40 and the outlet 41, together with the rear side 21b of the first stationary sliding ring, are located in a common plane 61, which is perpendicular to the axial direction X-X (cf. FIG. 1).

As may be seen from FIG. 2, cooling fluid, on the one hand, thus flows into the annular gap 7 starting from the inlet 40, and, on the other hand, flows through the second slot 8 into the circumferential eccentric gap 6. As a result rotating the conveying sleeve 5 (arrow A in FIG. 2), the cooling fluid both in the annular gap 7 (arrows B) and in the circumferential eccentric gap 6 (arrows C) is conveyed in the direction of the outlet 41.

As may be seen in FIGS. 2 and 3, a widening recess 11 is formed on the first stationary sliding ring 21. A second widening recess 12 is formed on the housing 4 at the outlet of the annular gap 7 to the outlet 41. This significantly improves flow performance of the fluid as it exits the annular gap 7 or the annular eccentric gap 6 into the outlet 41, thereby significantly improving cooling fluid conveying efficiency.

Figure 4:
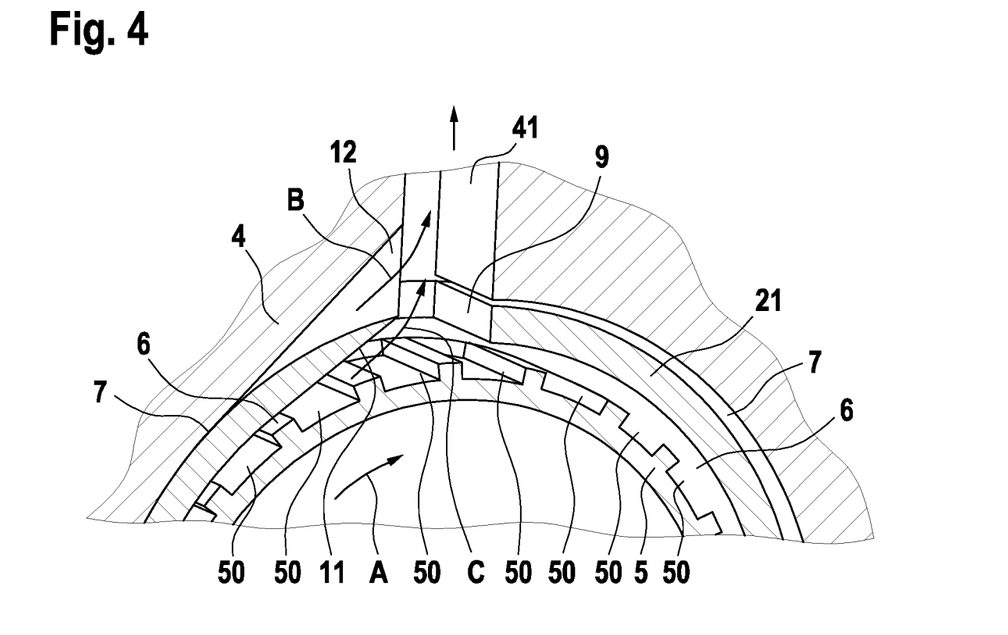
FIG. 4 is a schematic, enlarged cross-sectional view of the mechanical seal arrangement of FIG. 1 in the region of the outlet.

The annular eccentric gap 6 is thus formed between an inner circumference 21*a* of the first stationary sliding ring 21 and the outer circumference 50*a* of the conveying sleeve 5. Again, FIG. 4 shows in detail the exit of the fluid flows (arrows B, C) from the annular gap 7 and the circumferential eccentric gap 6, respectively. The cooling liquid is guided by the two widening recesses 11, 12 into the outlet 41 with the least possible losses, so that, in combination with the plurality of conveying grooves 50 in the conveying sleeve 5, significantly improved conveying efficiency may be achieved.

In the following, a mechanical seal arrangement according to a second preferred example embodiment of the invention will be described in detail while making reference to FIG. 6. Equal or functionally equal parts are designated with equal reference signs as in the first example embodiment.

Figure 6:
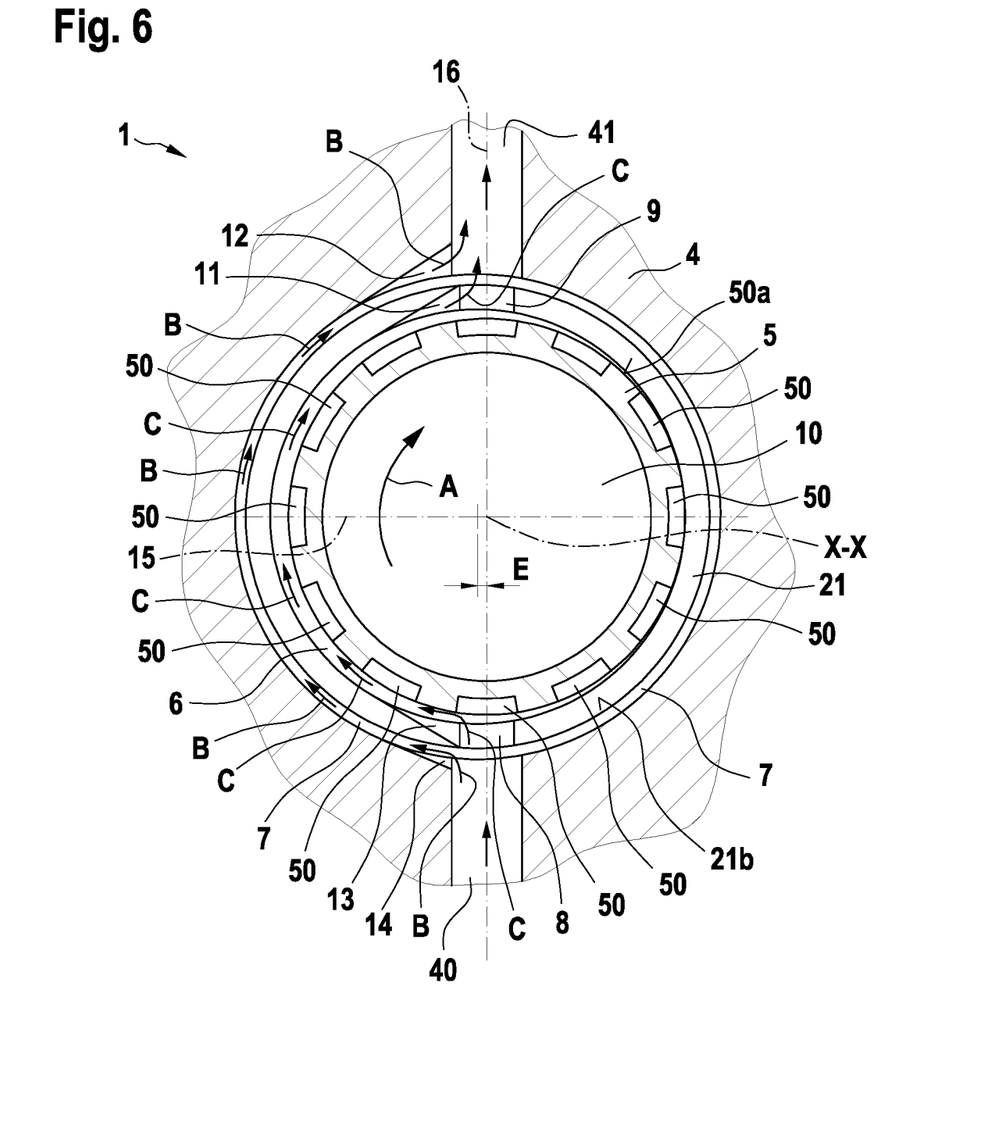
FIG. 6 is a schematic cross-sectional view of a mechanical seal arrangement according to a second preferred example embodiment of the invention.

As may be seen from FIG. 6, contrary to the first example embodiment, in the second example embodiment flow improvement is also realized at the inlet 40 of the mechanical seal arrangement 1. In this case, a third tapered recess 13 is provided on the rear side 21*b* of the first stationary mechanical sliding ring 21 facing away from the sealing gap, and a fourth tapered recess 14 is formed in the housing 4. Thereby, as shown in FIG. 6, a second slot 8 is formed at the rear side 21*b* of the first stationary sliding ring 21. Thus, flow-efficient supply of the fluid from the inlet 40 becomes possible. Herein, the fluid flows into the eccentric gap 6 via the third tapered recess 13 and from the inlet 40 into the annular gap 7 via the fourth tapered recess 14. Another advantage of this embodiment resides in that the mechanical seal arrangement is independent of the rotational direction. That is, when reversing the rotational direction A, the outlet 41 becomes the inlet and the inlet 40 becomes the outlet. Since the first, second, third and fourth recesses 11, 12, 13, 14 are now provided mirror-inverted on the horizontal 15, this may smoothly be realized without problems. Furthermore, an eccentricity E is also different compared to the first example embodiment such that the eccentricity E was created by displacement along the horizontal line 15 from the center (center axis X-X). The eccentricity E created in this way thus results in equal cooling capacities of the mechanical seal arrangement 1 irrespective of the rotational direction.

Otherwise, this example embodiment corresponds to the preceding example embodiment, so that reference can be made to the description given therein.

Thus, according to the invention, a mechanical seal arrangement 1 may be provided which enables a significantly improved cooling effect by providing a combination of several measures to the mechanical seal arrangement. In particular, provision of the conveying sleeve 5 having conveying grooves 50 as well as the first and second widening recesses 11, 12 on the housing and on the first stationary mechanical seal 21, respectively, significantly improves cooling performance of the mechanical seal arrangement. Another improvement will be achieved by the provision of the third and fourth recesses 13, 14, wherein the mechanical seal arrangement may also be operated in both rotational directions. In particular, the improved cooling effect of the mechanical seal arrangement means that it can also be used to seal media which may exhibit high to very high temperatures without resulting in damage of the mechanical seal arrangement.

LIST OF REFERENCE NUMBERS

1 Mechanical seal arrangement
2 First mechanical seal
3 Second mechanical seal
4 Housing
5 Conveying sleeve
6 Annular eccentric gap
7 Annular gap
8 Second slot
9 First slot
10 Shaft
11 First widening recess on first stationary sliding ring
12 Second widening recess on housing
13 Third tapered recess
14 Fourth tapered recess
15 Horizontal line
16 Vertical line
20 First sealing gap
21 First stationary sliding ring
21*a* Inner circumference of first stationary sliding ring
21*b* Rear side of first stationary sliding ring
22 First rotating sliding ring
30 Sealing gap
31 Second stationary sliding ring
32 Second rotating sliding ring
33 Sliding ring support
40 Inlet
41 Outlet
50 Conveying grooves
50*a* Outer circumference of the conveying sleeve
51 Receiving region on the conveying sleeve
60 Centerline of inlet and outlet
61 Plane
E Eccentricity
G 45° straight line
T Depth of first and second slots
X-X Axial direction of mechanical seal arrangement

The invention claimed is:
1. A mechanical seal arrangement comprising:
a first mechanical seal including a first rotating sliding ring and a first stationary sliding ring defining a first sealing gap therebetween,
a second mechanical seal having a second rotating sliding ring and a second stationary sliding ring defining a second seal gap therebetween,
a housing with an inlet and an outlet for a cooling liquid,
a rotating conveying sleeve which is joined to the first rotating sliding ring and the second rotating sliding ring, said conveying sleeve having a plurality of conveying grooves on its outer circumference, wherein the first stationary sliding ring is arranged radially outside the conveying sleeve and has an inner circumference which is eccentric to an outer circumference of the conveying sleeve so that a circumferential eccentric gap is formed between the outer circumference of the conveying sleeve and the inner circumference of the first stationary sliding ring, and wherein the first stationary sliding ring, on a rear side facing away from the first sealing gap, has a first slot directed towards the outlet and a first widening recess on the inner circumference, which recess opens into the first slot.

2. The mechanical seal arrangement according to claim 1, wherein an annular gap is formed adjacent to the rear side of the first stationary sliding ring between the housing and the outer circumference of the first stationary sliding ring.

3. The mechanical seal arrangement according to claim 2, wherein a second widening recess is formed on the housing, which recess opens from the annular gap into the outlet.

4. The mechanical seal arrangement according to claim 1, wherein the conveying sleeve has a receiving region for fixing the first rotating sliding ring.

5. The mechanical seal arrangement according to claim 1, wherein a number n of the conveying grooves of the conveying sleeve is greater than or equal to 12 and in particular is between $18 \leq n \leq 24$.

6. The mechanical seal arrangement according to claim 1, wherein the rear side of the first stationary sliding ring is located radially inside the outlet.

7. The mechanical seal arrangement according to claim 6, wherein a center line of the outlet and the back side of the first stationary sliding ring lie in a common plane which is perpendicular to the axial direction of the mechanical seal arrangement.

8. The mechanical seal arrangement according to claim 1, wherein the inlet and the outlet are arranged in the axial direction of the mechanical seal arrangement between the first mechanical seal and the second mechanical seal.

9. The mechanical seal arrangement according to claim 1, wherein the inlet and the outlet are opposite each other by 180° at the circumference of the mechanical seal arrangement.

10. The mechanical seal arrangement according to claim 1, wherein a volume of the second widening recess on the housing is larger than a volume of the first widening recess on the first stationary sliding ring.

11. The mechanical seal arrangement according to claim 1, wherein the annular gap has a constant gap width along its circumference.

12. The mechanical seal arrangement according to claim 1, wherein the eccentricity between the conveying sleeve and the first stationary sliding ring is located on a horizontal line of the mechanical seal arrangement.

13. The mechanical seal arrangement according to claim 1, wherein the first stationary sliding ring has a second slot on the rear side facing away from the sealing gap and a third, tapered recess on the inner circumference, which, starting from the second slot, tapers in the direction of the eccentric gap.

14. The mechanical seal arrangement according to claim 13, wherein a fourth tapered recess is formed on the housing, which tapers from the inlet into the annular gap.

15. The mechanical seal arrangement according to claim 1, wherein the mechanical seal arrangement is a pre-assemblable assembly.

* * * * *